Aug. 29, 1933.  N. E. NUNNERY  1,924,956
CULTIVATOR
Filed May 14, 1932   2 Sheets-Sheet 1

Inventor
Norman E. Nunnery

By Geo. P. Kimmel
Attorney

Aug. 29, 1933.  N. E. NUNNERY  1,924,956
CULTIVATOR
Filed May 14, 1932   2 Sheets-Sheet 2
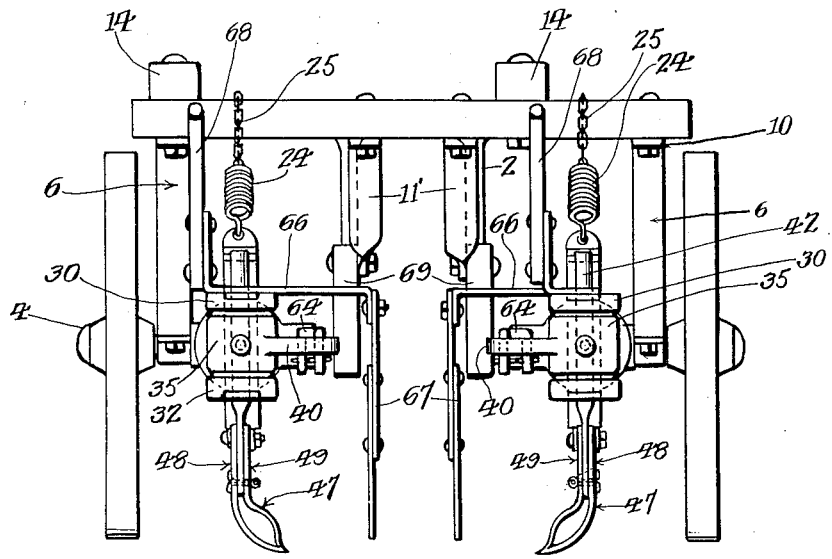
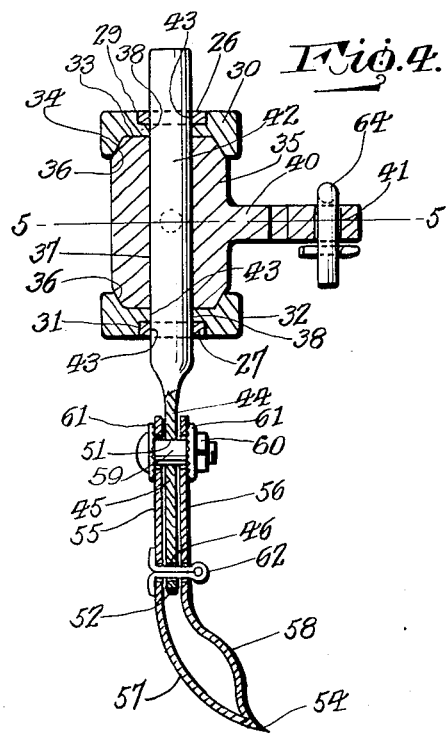
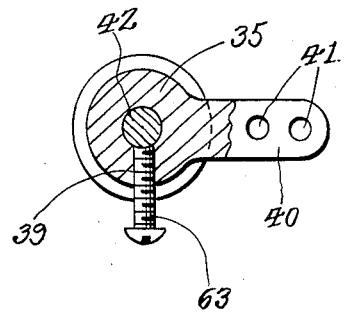
Inventor
Norman E. Nunnery
By Geo. P. Kimmel
Attorney Patented Aug. 29, 1933

1,924,956

UNITED STATES PATENT OFFICE 1,924,956

CULTIVATOR

Norman E. Nunnery, Headland, Ala.

Application May 14, 1932. Serial No. 611,416

3 Claims. (Cl. 97—198.1)

This invention relates to cultivators, and has for its object to provide, in a manner as hereinafter set forth, a device of the class referred to including horizontally movable independent gangs, each provided with a combined weeding and digging foot so constructed and arranged relative to the gang of which it forms an element to permit of the horizontal twisting around of the foot on the moving of its gang horizontally, whereby the foot will be maintained in a position resulting in a thoroughly efficient cultivation of the ground during the travel of the cultivator.

Further objects of the invention are to provide, in a manner as hereinafter set forth, a cultivator which is simple in its construction and arrangement, strong, durable, compact, thoroughly efficient in its use, readily assembled, quickly repaired when occasion requires, and comparatively inexpensive to set up.

To the above ends essentially and others which may hereinafter appear, the invention consists of such parts, and such combination of parts which fall within the scope of the invention as claimed.

In the drawings:—

Figure 3 is a rear elevation.

Figure 4 is a section on line 4—4 Figure 1.

Figure 5 is a section on line 5—5 Figure 4.

Figure 1:
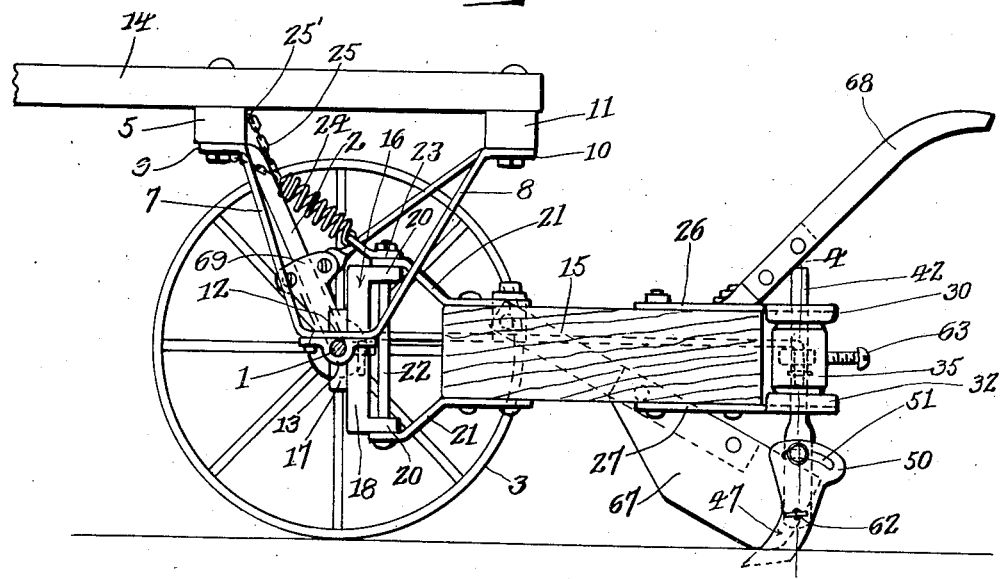
Figure 1 is a side elevation of a cultivator in accordance with this invention.
Figure 2:
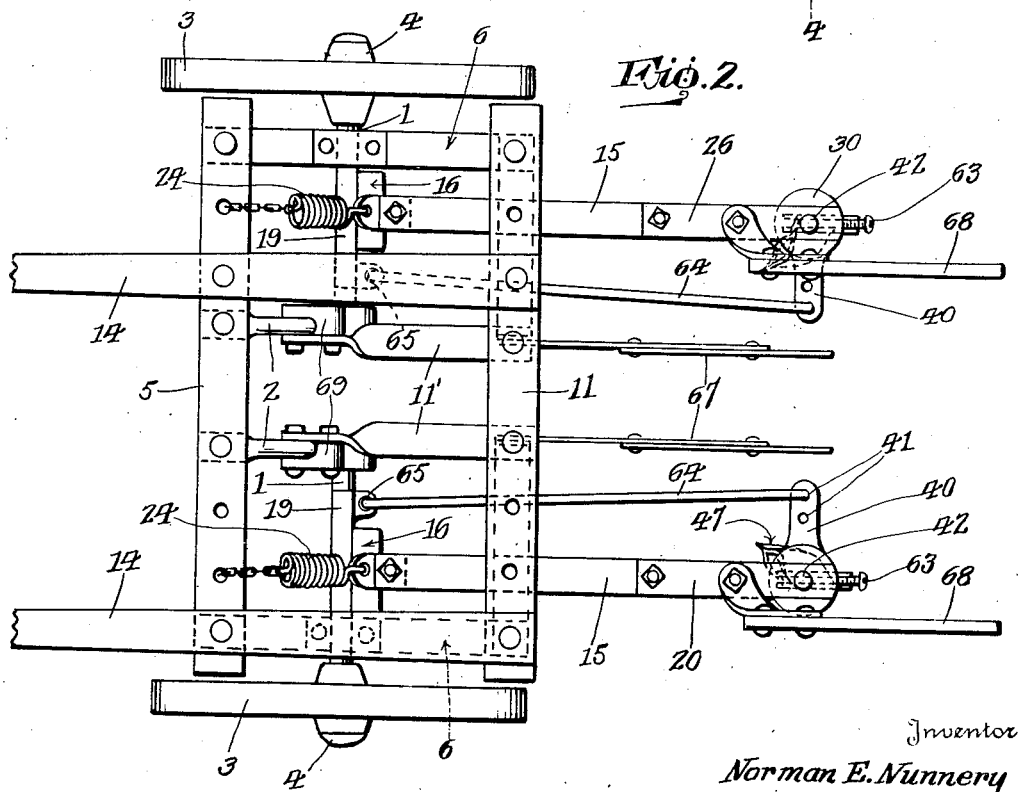
Figure 2 is a top plan view thereof.

Referring to the drawings, the cultivator includes an axle formed of two spaced oppositely disposed sections, each consisting of a horizontal part 1 and an upstanding part 2. Revolubly mounted on parts 1 are wheels 3. Dust caps 4 are secured to the outer ends of parts 1. The parts 2 are arranged at the inner ends of parts 1 and at their upper ends are secured to a front cross bar 5. Secured to the parts 1 in proximity to the wheels 3 are upstanding V-shaped supports 6 having the side portions thereof indicated at 7, 8. The upper end of the side portions 7 of the supports 6 are formed with right angularly disposed and forwardly projecting extensions 9 which are secured to the bottom of cross bar 5. The upper ends of the side portions 8 of the supports 6 are provided with right angularly disposed and rearwardly projecting extensions 10 which are secured to the lower face of a rear cross bar 11. Connected to the parts 2 are rearwardly extending combined braces and supports 11' which are secured to the lower face of cross bar 10. The side portion 8 of each support 6 is of greater length but has its upper end aligned with the top of side portion 7. The base 12 of each support 6 is seated on an axle section and fixedly secured thereto as at 13. Connected to the cross bars 5, 11 is a pair of forwardly directed shafts 14.

The cultivator, as shown includes a pair of spring controlled gang structures, independent of each other and each being bodily shiftable upon a horizontal pivot and each including a beam horizontally shiftable upon a vertical pivot. The gang structures are of like construction and the description of one will apply to the other. Each gang structure includes in connection with a wooden beam 15, a coupling element 16 pivotally mounted on an axle section 1, formed of a body part 17 having a vertical arm 18 at its rear extending upwardly and depending therefrom, a lateral arm 19 at its inner side, and a pair of rearwardly directed spaced apertured lugs 20, one at the top and the other at the bottom of said arm 18. The beam 15 at its forward end has secured thereto a pair of oppositely offset forwardly extending links 21 which are pivotally connected by a pivot bolt 22 to the lugs 20. Coupled with beam 15 by the bolt 22 is a forwardly extended apertured coupling piece 23 for the lower end of a controlling spring 24. Attached to the upper end of the latter is a flexible tensioning member 25 for the spring and which is shown as being in the form of a chain capable of being adjustably connected lengthwise thereof to a hook 25' on bar 5.

The beam 15 has secured upon its top and bottom edges a pair of rearwardly extending apertured resilient holding members 26, 27 of rectangular cross section. The rear ends of the members 26, 27 extend beyond the rear end of beam 15. The rear end of member 26 seats in a squared groove 29 formed on the outer or upper face of a washer 30. The rear end of member 27 seats on a squared groove 31 formed in the outer or lower face of a washer 32. The washers 30, 32 are arranged in superposed relation adjacent the rear end of beam 15. The inner face of each washer is formed with a recess 33 having a tapered wall 34. Interposed between the washers 30, 32 and extending into the recess 33 is a shank 35 having tapered ends 36. Shank 35 is formed with a vertical bore 37 having its wall registering with that part 38 of smallest diameter of the inner edge of each washer. The shank 35 is also formed with a diametrically disposed passage 39 which extends from its outer periphery to the bore 39. Integral with the shank 35 intermediate the ends of the latter, and disposed at right angles thereto, is a lateral arm 40 formed with a plurality of spaced openings 41. The shank 35 is revoluble horizontally within the washers, and the latter are prevented from shifting relative to shank 35 by the holder members 26, 27.

Vertically adjustable within the shank 35 is a standard 42 which extends above and depends from the holder members. The standard extends through the bore 37, washers and holder members. The apertures in the latter through which the standard passes are indicated at 43. The lower portion of standard 42 is flattened as at 44 and apertured at the points indicated 45, 46. Adjustably mounted on the flattened part 44 of the standard is a ground working shoe 47 formed of inner and outer opposed spaced parts 48, 49 respectively and each of said parts has an enlarged upper portion 50 provided with an arcuate slot 51. Each of the parts 48, 49 of the shoe is formed with openings 52 arranged below slot 51, the opening in one shoe part aligning with the opening in the other. The slots 51 and openings 52 register with the openings or apertures 45, 46 respectively. The parts 48, 49 merge into each other at their lower ends to provide a combined cutting edge and point 54 extending inwardly at a downward inclination. The parts 48, 49 include perpendicular portions 55, 56 respectively. That portion 57 of the part 48 below portion 55 of the latter extends inwardly upon a concave curve. That portion 58 of the part 49 below portion 56 of the latter extends inwardly and is of ogee curvature. The part 44 of the standard 35 is arranged between the portions 55, 56 of the shoe. Extending through the slots 51 and opening 46 is a releasable holdfast means upon which the shoe can be adjusted and held thereby in its adjusted position. The holdfast means includes a bolt 59, nut 60 and a pair of binding washers 61. Extending through the aligning openings 49, 52 is a cotter pin 62.

Engaging with the wall of the passage 39 is a set or binding screw 63 for the standard 42. A twisting rod 64 is provided for shank 35, and which at one end is loosely attached to an apertured lug 65 on arm 19 and at its other end is loosely attached in one of the selected openings 41. Extended inwardly and laterally from the top of beam 15 forwardly of the member 26 is an angle-shaping coupling arm 66 to which a rearwardly extending, downwardly inclined furrow guide 67 is attached. Secured to the beams 15 are rearwardly directed handle members 68. One of the handle members 68 is arranged outwardly from the beam 15 of one gang structure and inwardly of the beam 15 of the other gang structure.

Reinforcing means 69 for the axle part 2 are mounted upon axle parts 1 and secured to axle parts 2.

The construction and arrangement of each gang structure is such that if it be moved horizontally in either direction, the shank 15 thereof will be twisted whereby the shoe is maintained in the desired position to perform its function in a satisfactory manner.

What I claim is:—

1. A cultivator comprising a gang structure for pivotal mounting at one end on the axle of the cultivator and including a pivoted horizontally movable beam, a pair of flat, oblong holder members secured to and extending from the rear end of the beam, a pair of superposed spaced oppositely disposed washers arranged adjacent the rear end of the beam and having their inner faces formed with tapered recesses and their outer faces with squared grooves, said members having their rear end portions seated in said grooves, a tubular vertical shank interposed between said washers and having tapered ends revolubly mounted in said recesses, a ground working shoe carried by the shank and bodily movable therewith, a handle member attached to the beam, and connections between said shank and the forward end of said structure to provide for the twisting of the shank when the beam is moved horizontally.

2. A cultivator comprising, a gang structure for pivotal mounting at one end on the axle of the cultivator and including a pivoted horizontally movable beam, a pair of flat, oblong holder members secured to and extending from the rear end of the beam, a pair of superposed spaced oppositely disposed washers arranged adjacent the rear end of the beam and having their inner faces formed with tapered recesses and their outer faces with squared grooves, said members having their rear end portions seated in said grooves, a tubular vertical shank interposed between said washers and having tapered ends revolubly mounted in said recesses, a vertically adjustable standard mounted in the shank, means for fixedly securing the standard to the shank to provide for the former bodily moving with the latter, an angularly adjustable ground working shoe adjustably connected at its upper end and detachably coupled intermediate its ends to the standard, a handle member attached to the beam, and connections between the shank and the forward end of said structure to provide for the twisting of the shank when the beam is moved horizontally.

3. In a cultivator, a gang structure including a horizontally and upwardly movable pivoted beam, a pair of holder members secured to the top and bottom faces of the beam and extended rearwardly therefrom, a pair of superposed oppositely disposed washers having the inner faces thereof recessed, said washers having the outer faces thereof grooved, said members extending into said grooves to prevent the shifting of the washers relative thereto, a vertical shank disposed between and having its ends revolubly mounted in said recesses, a vertically adjustable standard extending through the said washers members and shank, means carried by the shank for maintaining the standard in its adjusted position, an angularly adjustable ground working shoe mounted upon extended from and detachably coupled to the lower portion of the standard, and means to provide for bodily twisting of the shank on the horizontal movement of the beam.

NORMAN E. NUNNERY.